(12) United States Patent
Liss et al.

(10) Patent No.: US 10,928,531 B2
(45) Date of Patent: Feb. 23, 2021

(54) SEISMOMETER

(71) Applicants: Aaron Liss, Silver Spring, MD (US); Daniel Liss, Silver Spring, MD (US)

(72) Inventors: Aaron Liss, Silver Spring, MD (US); Daniel Liss, Silver Spring, MD (US)

( * ) Notice: Subject to any disclaimer, the term of this patent is extended or adjusted under 35 U.S.C. 154(b) by 0 days.

(21) Appl. No.: 16/505,958

(22) Filed: Jul. 9, 2019

(65) Prior Publication Data

US 2021/0011184 A1    Jan. 14, 2021

(51) Int. Cl.
*G01V 1/22*   (2006.01)
*G01J 9/02*   (2006.01)
*G01V 1/34*   (2006.01)

(52) U.S. Cl.
CPC .............. *G01V 1/226* (2013.01); *G01J 9/02* (2013.01); *G01V 1/34* (2013.01)

(58) Field of Classification Search
CPC .......... G01V 1/226; G01V 1/242; G01V 1/34; G01J 9/02; G01J 2009/0223; G01J 2009/0234; G01J 2009/028
See application file for complete search history.

(56) References Cited

U.S. PATENT DOCUMENTS 4,119,173 A * 10/1978 Sekhavat ................ G01H 9/00
                                                  181/122
4,874,942 A * 10/1989 Clauser ................... G01P 15/08
                                                  250/251
4,992,656 A *  2/1991 Clauser .................... G01P 3/44
                                                  250/251
5,170,221 A * 12/1992 Matsui ..................... G01J 1/04
                                                  250/237 G
8,743,372 B2 *  6/2014 Fourguette ............... G01V 1/18
                                                  356/480

OTHER PUBLICATIONS

Gorbov, Ivan et al. "Combined Seismic Sensor Based on Digital Laser Interferometer". International Young Scientists Forum on Applied Physics and Engineering. 2016 II International Young Scientists Forum on Applied Physics and Engineering (YSF). Oct. 10-14, 2016, pp. 179-182. (Year: 2016).*

Acernese, Fausto et al. "A Michelson interferometer for seismic wave measurement: theoretical analysis and system performances". Proc. SPIE 6366, Remote Sensing for Environmental Monitoring, GIS Applications, and Geology VI, 636601, Oct. 3, 2016. (Year: 2016).*

* cited by examiner

*Primary Examiner* — Michael A Lyons
(74) *Attorney, Agent, or Firm* — David Fink

(57) ABSTRACT

The seismometer uses the interference between light emerging from two closely spaced slits to create an interference pattern. A light detector is used to detect the amplitude of the interference pattern at a specific spatial position. One slit is part of a support for the seismometer, and the other slit is on a pendulum suspended from the support. Vibrations from an earthquake are communicated much better to the slit which is part of the support as compared to the slit on the pendulum. Thus, the vibrations result in a relative movement between the slits and this change in separation between the slits results in the interference pattern from the slits to move. The change in the interference pattern changes the amplitude at the light detector, thereby providing a detectable measurement of vibrations.

8 Claims, 4 Drawing Sheets

PRIOR ART

SEISMOMETER

FIELD OF THE INVENTION

This invention relates to a seismometer using a system for the detection of a relatively small displacement from a predetermined fixed point.

The invention uses an optical system based on the famous experiment by Thomas Young 200 years ago to prove at that time that light behaves light waves. The invention does not require a laser light.

CROSS REFERENCE TO RELATED APPLICATIONS

There are no related applications by the same inventors.

STATEMENT OF FEDERAL FUNDING

There was no federal funding for the work and development of the invention.

STATEMENT AS TO JOINT RESEARCH AGREEMENT

There was no joint research agreement related to the invention.

BACKGROUND OF THE INVENTION

The invention is a variation of the system used more than 200 hundred years ago by Thomas Young to demonstrate that light moves as waves. Young showed that light projected onto two relatively closely positioned slits resulted in an interference pattern of the light emerging from the two slits. The light source Young used was sunlight, and the close spacing of the slits resulted in the light emerging from the slits being relatively coherent to each other.

Some coherency between the light emerging from the slits is necessary to create an interference pattern. This experiment by Young proved, at that time, that light traveled in the form of waves because the light emerging from the slits created an interference pattern between the two emerging light waves. We now have-a quantum physics view of light, and under modern physics, light travel like particles, but a mathematical model of Young's experiment is still valid for predicting an interference pattern from two slits. In fact, an analysis based on light viewed as a wave is applicable for explaining many phenomena even today.

A mathematical analysis of the Young's system reveals that a displacement of one slit relative to the other slit as small as about 100 nm can be detected by measuring the change in the interference pattern. In fact, the phenomena of the displacement of one slit relative to the other slit is effectively magnified in the change in the interference pattern, and easily observed by a light detector. Until now, this aspect of Young's experiment has remained unexploited since Young announced his discovery. The significance of measuring a displacement as small as 100 nm can be appreciated by noting that a virus has a width of about 100 nm. Until now, a displacement of about 100 nm has required very expensive, highly specialized equipment.

Conventional seismometers for detecting earth movements resulting from seismic waves use a magnetized ball suspended within an electromagnetic coil. The coil is attached to the housing while the magnetized ball is suspended by a wire in the housing. When there is relative movement between the ball and the coil, an electrical current is generated in the coils in accordance with Faraday's Law. Sophisticated equipment is used to detect the very small electrical current as an indication of seismic activity. The operation of the conventional seismometer is described as follows.

The housing of the seismometer moves in response to seismic vibrations traveling through the earth. The electromagnetic coil attached to the housing moves with the housing due to the seismic vibrations. A negligible amount of seismic vibrations is communicated to the suspended ball through the supporting wire, and inertia tends to inhibit the movement of the magnetized ball. Thus, a seismic vibration creates a relative movement between the magnetized ball and the electromagnetic coil to generate an electrical current related to the seismic event.

The conventional seismometer system is currently used for the detection and recording of seismic events throughout the world. The detection of seismic events enables scientists to identify the location and magnitude of an earthquake. The detection of seismic events most importantly enables a warning to people of an after-shock wave associated with significant seismic events.

Typically, seismometers are distributed throughout a country and the occurrence of an electrical signals due to an earthquake is detected at many locations. The detected signals at many locations are communicated to a central office to enable the location of an earthquake event using the information from many seismic detectors to determine the origin of the seismic event and to estimate the magnitude.

BRIEF SUMMARY OF THE INVENTION

The invention is a seismometer, comprising a housing, a first screen integral to said housing; said first screen having a first slit defined therein; a second screen having a second slit defined therein; suspending means for suspending said second screen from said housing like a pendulum to position said first and second slits near each other; said first screen having a first aperture defined in it to allow light to pass through said first and second screens from one side to the other side through said second slit; said second screen having a second aperture defined in it to allow light to pass through said first and second screens from one side to the other side through said first slit; a radiation source illuminating said first and second slits from one side so that the rays from the radiation source pass through said first and second slits to the other side; a radiation detector positioned at the other side to detect the interference between the rays of radiation from said first and second slits at a predetermined position; and display means for displaying the magnitude of the radiation detected at the predetermined position by said radiation detector.

The invention can also be adapted to detect secret tunneling, or mining activities which result in vibrations of the earth, and other events which can create vibrations in the earth's crust such as a volcano eruption, or a huge explosion.

Young used sunlight as his "radiation source" to create an interference pattern. It is preferable to use a radiation source having more coherency than sunlight. A laser light source can be used; however, actual experiments confirm that an off the shelf radiation source having a narrow frequency bandwidth is suitable and much less expensive, thereby simplifying the construction and costs of the invention. As used herein, a "radiation source" refers to a "light source" which can be as simple as sunlight, or as complex as a laser. Preferably, the "radiation source" is a readily available radiation source having a relatively narrow frequency band to produce a relatively high coherency for making the invention for practical applications. It is preferable to a use radiation source generating relatively long wavelength such as radiation near or within infra-red. A compatible radiation detector is necessary.

It is preferable to have both slits essentially the same size and with the same orientation. This arrangement is expected to produce exiting radiation from the two slits to be about the same magnitude so that when the waves have opposite phases, the waves will subtract to produce about a zero result. The transition from a "peak" to about a zero value makes the measurement more convenient.

It is evident that the invention is not limited to measuring seismic events due to earthquakes. The application of the invention for measuring vibrations makes the invention suitable for measuring secret tunneling, or secret powerful explosions, or volcanic eruptions, or similar events creating vibrations in the earth's crust.

BRIEF DESCRIPTION OF THE DRAWINGS

A clear understanding of the key features of the invention summarized above may be had by reference to the appended drawings, which illustrate the system of the invention. It will be understood that such drawings depict a preferred embodiment of the invention and are not to be considered as limiting its scope of the invention with regard to other possible embodiments as contemplated by this disclosure. The drawings are not drawn to scale.

DETAILED DESCRIPTION OF THE INVENTION

Figure 1:
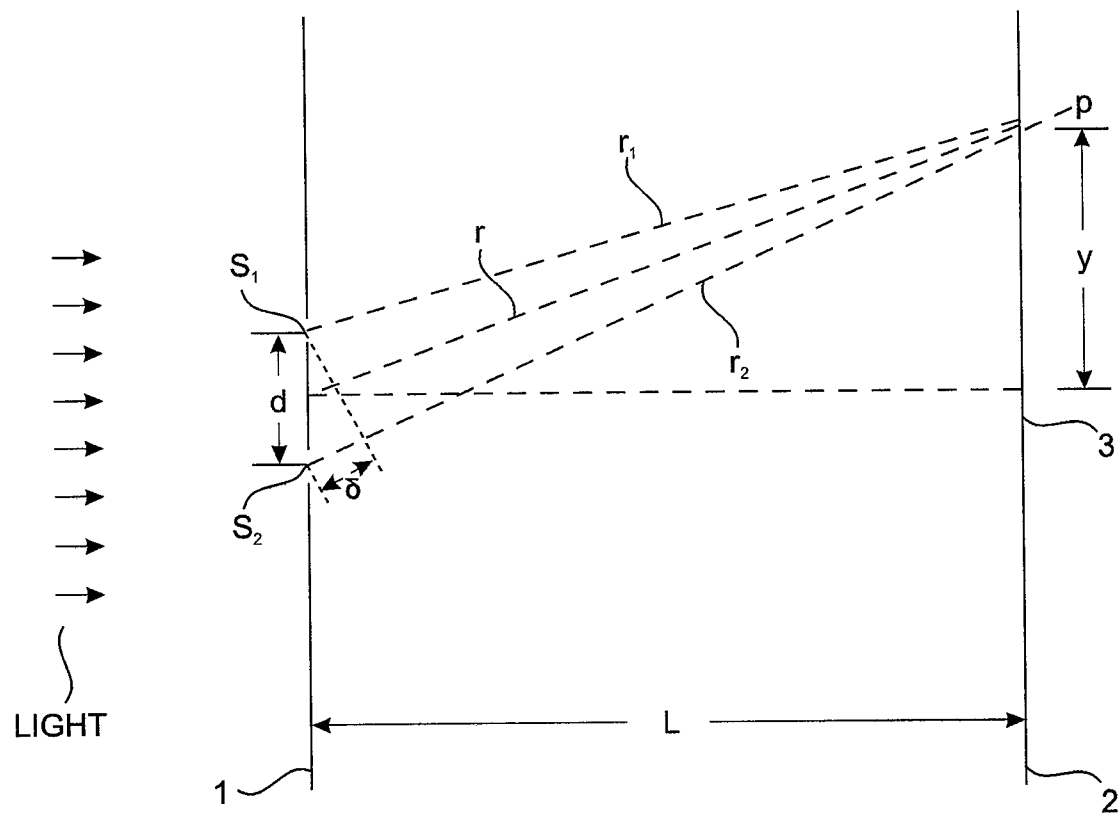
FIG. 1 is a sketch showing the classic dual slit experiment performed by Thomas Young in the early 1800's to demonstrate that light moves like waves.
Figure 2:
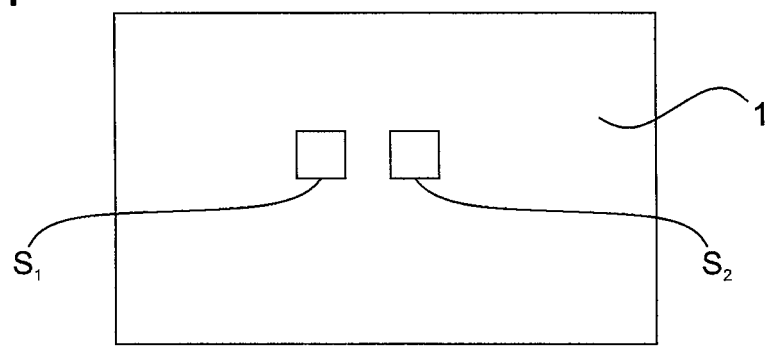
FIG. 2 is a front elevation view of the two slits defined in a single screen for the Young experiment.

FIG. 1 shows a sketch depicting the famous double slit experiment that Thomas Young performed in the early 1800's to show that light moves like waves. Light shown at the left impinges on the slits $S_1$ and $S_2$ from the left of a screen 1. The slits $S_1$ and $S_2$ are separated by a distance of d, measured center to center. FIG. 2 shows a front view of screen 1 with the slits $S_1$ and $S_2$. The light emerging from the slits $S_1$ and $S_2$ creates an interference pattern even if the light is not from a totally coherent light source such as a laser. Young proved this by using sunlight. The interference pattern of the light from slits $S_1$ and $S_2$ is effectively projected onto screen 2, and is observable. This experiment is often shown to students in high school and even college. Screens 1 and 2 are generally parallel planes separated by distance L.

If the slits $S_1$ and $S_2$ are substantially identical and the illumination on the slits $S_1$ and $S_2$ is relatively uniform, the maximum value of the interference pattern is at about position 3 on the screen 2, and position 3 is along the perpendicular bisector of a line between the slits $S_1$ and $S_2$.

The path from the center point of the slits $S_1$ and $S_2$ to a predetermined point P is shown as imaginary line r. The light from slit $S_1$ travels along the imaginary line r to point P on the screen 2 and the light from slit $S_2$ travels along the imaginary line $r_2$ to point P on the screen 2. The difference in the paths $r_1$ and $r_2$ is $\delta$, as shown in FIG. 1.

If $\delta$ is a multiple of $2\pi$, the light at point P is the sum of the magnitudes of the light from slits $S_1$ and $S_2$ at point P, a peak value. If $\delta$ is an odd multiple of $\pi$, the light at point P is the difference between the magnitudes of the light from slits $S_1$ and $S_2$ at point P, a null value if both magnitudes are about the same. The distance between peak values at screen 2 depends on the value of L, the value of d, and the wavelength of the light. The relationship between the noted parameters and peaks will be shown mathematically below.

If we assume that the light emanating from slits $S_1$ and $S_2$ are relatively coherent, then the interference pattern on screen 2 will vary as the measuring position, point P, is moved because of the difference in the paths $r_1$ and $r_2$ results in $\delta$ changing so the light rays at one given point P may add to a relative maximum, and at a different point P may subtract to produce a relative minimum. The intermediate values between adding and canceling occur between the extreme values of adding and subtracting.

If, however, a fixed position P is observed, or being measured and the distance between the slits $S_1$ and $S_2$ is change, the value of d changes and thereby impacts the value of $\delta$ and thereby, changing the adding and canceling of the light waves at the fixed position P depending on the phase difference between the light arriving at position P.

Hence, moving one slit relative to the other can change a measured peak value at position P to become a lower value, even a null value. This intuitive observation will be proven in the following mathematical analysis.

Using the classic formula for the Young experiment based on FIG. 1, the basic formula for the invention can be derived.

$$Ep = 2Eo\ e^{\hat{}}(-i\omega t)e^{\hat{}}ikr \cos(\Delta/2)) \tag{1}$$

This is the classic formula for Thomas Young's two slit experiment taken from "Lecture 19: Diffraction and Resolution" by Matthew Schwartz, https://www.google.com/url?sa=t&rct=j&q=&esrc=s&source=web&cd=2&ved=OahUKEwi-m9qNlq7SAhVC72MKHbZDCc8QFggiMAE&url=http%3A%2F2Fusers.physics.harvard.edu%2F~schwartz%2F15cFiles%2FLecture19-Diffraction.pdf&usg=AFQjCNHh-dekifxOrL8Q6BqUw70xJV95UQ&sig2=4y3DxDPE-IpQNEhVwb7UKw Where:
Ep=intensity at point P
$\omega = 2\pi f$
f=frequency of light source being used having a wavelength of $\lambda$
$k = 2\pi/\lambda$-constant
r=constant for the position at point P
$\Delta = (2\pi\ d/\lambda) \sin(\theta + \delta)$
d=distance between slits θ=angle to point P measured from the perpendicular bisector of the slits δ=difference in path length from slits to P Consider Eo e^(−iωt)=A, can be taken as a constant averaging over time e^ikr=B, can be taken as a constant for a selected position P We define d=(D+α), to examine the change between the slits of a (positive or negative)

D=original value of d before any change and is a constant for any system

α=displacement of one slit to the other the other slit, positive or negative

Substituting the defined values, we have for equation (1):

$$Ep = AB\ cos(\Delta/2) = AB\ cos[(2\pi d/\lambda)\sin\theta] = AB\ cos[(2\pi D/\lambda)\sin(\theta + 2\pi\alpha/\lambda)\sin\theta] \quad (2)$$

If Ep is along the perpendicular bisector of the line between the slits, the peak value for the interference pattern. Then sin θ=0, and $E_p$=AB.

$$D = \text{a fixed value, we can define a fixed value of } C, \quad (3)$$

$$C = 2\pi D/\lambda \quad (4)$$

Note that C is essentially the separation between the slits in radians. The portion of C which is whole number multiple of 2π is equivalent to zero degrees. Only the portion of C after the whole number multiple portion of 2π between zero and 2π effects changes in the value of Ep.

Now, with this simplification, equation (2) becomes:

$$Ep = AB\ cos(C + 2\pi\alpha/\lambda) \quad (5)$$

Using an identity from trigonometry:

$$Ep = AB\ cos(C)\cos(2\pi\alpha/\lambda) - AB\ \sin(C)\sin(2\pi\alpha/\lambda) \quad (6)$$

The only variables impacting Ep are the initial separation of the slits, D, which can change the value of C, and the displacement, α.

For convenience, an off the shelf LED red light source having a wavelength of about 600 nm was used as the radiation source to calculate results for different variable. The LED light source is guaranteed by the manufacturer to exhibit a very narrow bandwidth, which assures a relatively high degree of coherency. Of course, this type of light source was not available to Thomas Young in 1801, but Young intuitively compensated by having two slits closely spaced slits, and taking steps to collimate the sunlight.

The change in Ep due to a displacement of one slit relative to the other slit, a, depends on the initial separation between the slits. If the value of Ep is a peak, then a change in the separation between the slits is magnified in the change of the measured Ep due to the very small wavelength of the light so the value of the peak shifts. The change in the separation between the effectively shifts the peak value at position P. If parameters are carefully selected, that shift can go from a peak to a null value.

If:

$$Ep = \text{about 1 initially} \quad (7)$$

and decreases to

Ep=about zero

This is for a displacement of about 100 nm.

Not only is this a significant and observable change, but even a displacement of about 50 nm shows a change of about 50% for Ep which is also easily observable.

The change in the value of Ep depends on the initial separation between the slits, D, but even other initial changes produce significant changes in the value of Ep which are readily observable with off the shelf electronic equipment.

A separation D equivalent to about zero (an odd number of multiples of a) results in very small changes in Ep for displacements, a, and might be inconvenient to measure; however, preliminary tests of the system could reveal the accidentally unfavorable position and an adjustment could be made to create a more desire value for D by carefully moving the position of the detector. Another option is to carefully reposition one of the slits.

Therefore, it is realistic to expect that the system can identify displacements of about 100 nm, and less. This implies a super sensitive seismometer can be made using easily obtainable off the shelf equipment and measurements of vibrations within the earth's crust due to earthquakes, mining activities and underground tunneling can also be easily detected.

This novel method will be significantly less expensive and easier to build than traditional seismometers. Moreover, there will be an opportunity to significantly decrease the size of the seismometer. The low cost of the seismometer according to the invention will make it available to even non-scientists with a minimum of training with a simple do itself kit.

Figures 3A, 3B:
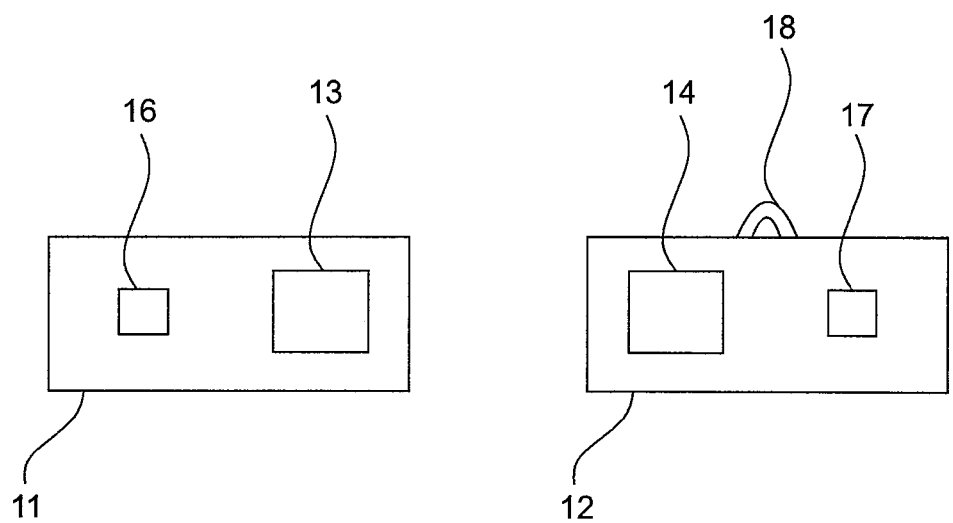
FIG. 3A is a front elevation view of one embodiment of one screen used in a preferred embodiment of the invention.
FIG. 3B is a front elevation view of one embodiment of a second screen used in a preferred embodiment of the invention.
Figure 3C:
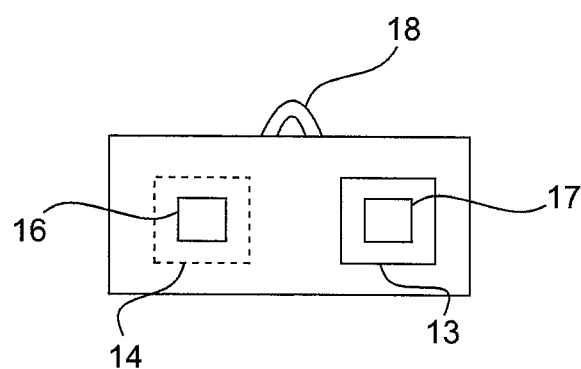
FIG. 3C is a front elevation view of the screens shown in Figs. A and B combined as used in the preferred embodiment of the invention.

There are many possible arrangements for creating two slits capable of moving relative to each other for use in the invention. A preferred embodiment will be disclosed herein. FIGS. 3A and 3B show screens 11 and 12 which are combined as shown in FIG. 3C for this invention to enable slit 16 and 17 to move relative to each other while allowing radiation to pass through both sits 16 and 17.

FIG. 3A shows screen 11 having a slit 16 defined in it to allow radiation to pass through it to be available for creating an interference pattern. Screen 11 also has a cutout 13 to allow radiation to pass through the screen 11 to allow the radiation to illuminate slit 17 when screen 12 is positioned behind screen 11 as shown in FIG. 3C.

FIG. 3B has a slit 17 to allow radiation to pass through it to be available for creating an interference pattern. Screen 12 has a cutout 14 to allow radiation emerging from slit 16 to continue long its path to be available for creating an interference pattern. The hook 18 on screen 12 shown in FIGS. 3B and 3C is used to suspend screen 12 in a manner of a pendulum so that vibrations due to an earthquake or some other source has a negligible effect on changing the position of screen 12.

Figure 4:
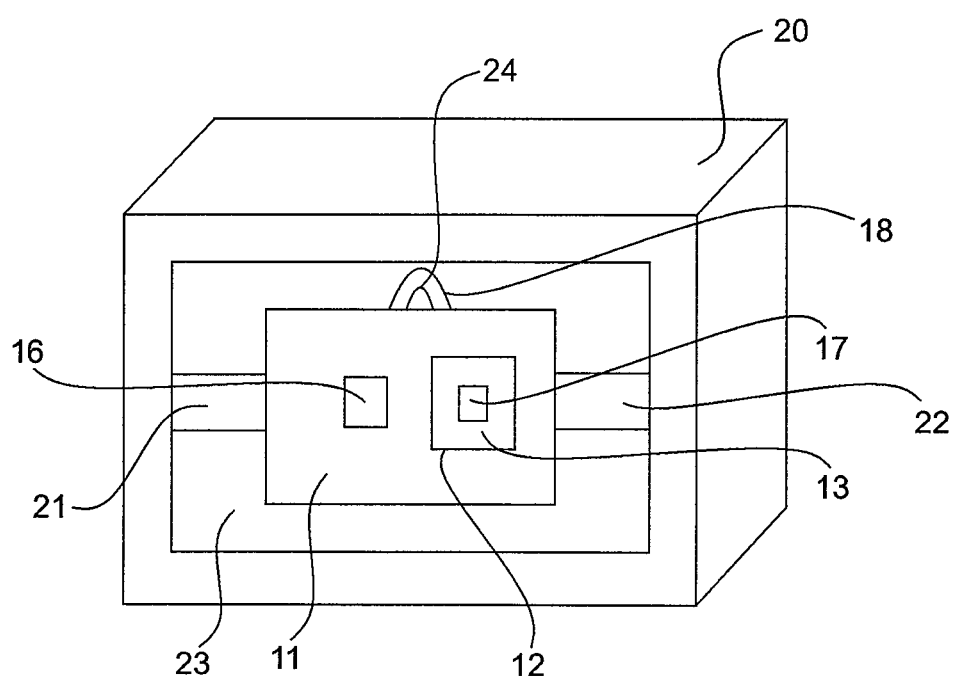
FIG. 4 is a front perspective view of the system according to the invention with the radiation source and the radiation detector not shown to simplify the view.

As shown in FIG. 4, screen 11 is secured to the housing 20 by supports 21 and 22 in the interior space 23 so that vibrations on the housing 20 are communicated directly to screen 11, thereby resulting in a movement of screen 11 when vibrations reach the housing 20. Screen 12 is suspended from hook 18 with wire 24 from the housing 20 behind screen 11 with a careful alignment to allow radiation to pass freely through slits 16 and 17. An adjustment can be made to screen 12 to achieve the correct positioning for a peak value. In simple terms, some weight can be added to achieve the change balanced position of the suspended frame 12. Another option is to change the position of frame 11 slightly. Yet another option is to change the position of the point at which the interference pattern is detected to be at a peak value.

Figure 5:
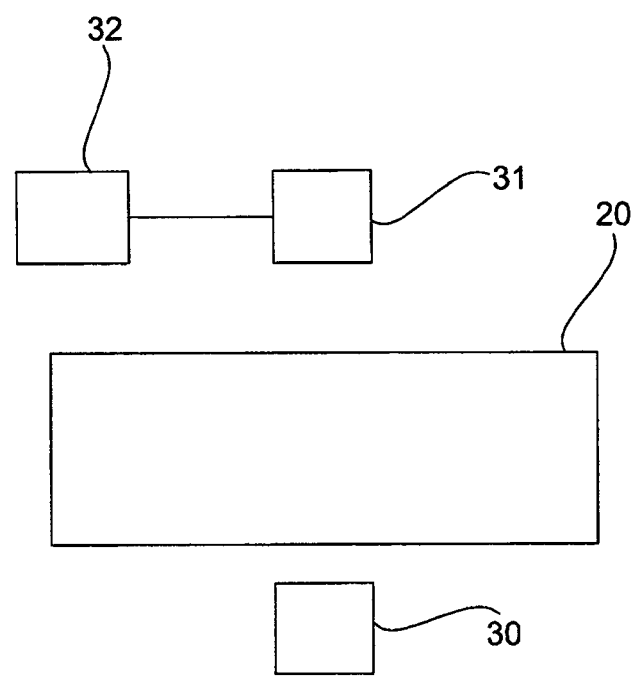
FIG. 5 is a top view of the preferred embodiment of the invention showing the radiation source positioned in front of the two screens, and the radiation detector positioned on the opposite side of the two screens.

FIG. 5 shows a top view of the embodiment of the invention shown in FIG. 4, and includes the radiation source 30 and the radiation detector 31.

In practice, the radiation source 30 is allowed to illuminate slits 16 and 17 and the interference pattern at a predetermined position is detected by the radiation detector 31.

In operation, vibrations in the earth's surface are communicate to the frame 20, and this results in the vibrations being communicated to screen 1. Movement of the frame 20 also results in the movement of screen 11, thereby resulting in movement of slit 16. The vibrations of the frame 20 are not communicated very well through wire 24 to frame 12 so that slit 17 remains essentially stationary. Thus, the vibrations result in relative movement between slit 16 and 17, and it has been shown above mathematically that the interference pattern changes when there is relative movement between slits 16 and 17. The change in the interference pattern at a predetermined position P generated by radiation source 30 is detected by the radiation detector 31. The detected amplitude of the radiation detector 31 is displayed on a known system such as display system 32. The display system 32 can be an oscilloscope (not shown) or an electronic meter showing signal amplitude (not shown).

What is claimed is:

1. A seismometer system, comprising:
   (a) a housing;
   (b) a first screen having both a first slit and a first aperture defined in said first screen; said first slit and said first aperture being spaced apart from each other, said first screen having a first side and a second side; both said first slit and said first aperture being capable of allowing light illuminating both said first slit and said first aperture to pass through said first screen; said first screen being physically attached to said housing,
   (c) a second screen having both a second slit and a second aperture defined in said second screen; said second slit and said second aperture being spaced apart from each other, said second screen having a third side and a fourth side; both said second slit and said second aperture being capable of allowing light illuminating both said second slit and said second aperture to pass through said second screen;
   (d) suspending means operable for suspending said second screen from said housing like a pendulum at a position near said first screen and in a position so that a light illuminating said first slit and said first aperture can also pass through said second aperture and said second slit, respectively;
   (e) a light source having a predetermined output frequency range positioned for illuminating both said first and said second slits while said second screen is suspended near said first screen; said first and said second slits being arranged relative to each other and said light source to create a light interference pattern from said light source passing through said first and said second slits;
   (f) a detector operable for detecting the light source and generating a signal representative of the detected amplitude of light from said light source; said detector positioned for detecting the amplitude of the light of said light interference pattern at a predetermined spatial position; and
   (g) display means connected to said detector and operable for displaying a signal representative of the amplitude of said light source at a predetermined spatial position of said detector;
   whereby said display means displays the change in the amplitude of the signal detected by said detector resulting from the relative movement between said first slit relative to said second slit.

2. The seismometer system as claimed in claim 1, wherein said first and second slits are similar in shape and size, and said first and second slits have the same orientation.

3. The seismometer system as claimed in claim 1, wherein said light source is not a laser.

4. The seismometer system as claimed in claim 1, wherein said light interference pattern exhibits many peak values and spatial position of said detector is, at one of the peak values.

5. The seismometer as claimed in claim 4, wherein said detector is located at a greatest peak value of said tight interference pattern near the perpendicular bisector of an imaginary line connecting said slits.

6. The seismometer as claimed in claim 1, wherein said light source is an LED light source.

7. The seismometer as claimed in claim 1, wherein said light source is a light source having a wavelength of about 600 nm.

8. The seismometer as claimed in claim 1, wherein said suspending means comprises a wire.

* * * * *